United States Patent [19]
Crider

[11] Patent Number: 6,122,972
[45] Date of Patent: Sep. 26, 2000

[54] CAPACITIVE PRESSURE SENSOR WITH MOVING OR SHAPE-CHANGING DIELECTRIC

[75] Inventor: Jim Crider, Portland, Oreg.

[73] Assignee: Veris Industries, Portland, Oreg.

[21] Appl. No.: 09/034,976

[22] Filed: Mar. 4, 1998

[51] Int. Cl.[7] .................................................. G01L 9/12
[52] U.S. Cl. ............................ 73/724; 73/749; 73/706; 361/283.4
[58] Field of Search ........................ 73/706, 718, 724, 73/749; 361/283.4

[56] References Cited

U.S. PATENT DOCUMENTS

| | | | |
|---|---|---|---|
| 2,746,295 | 5/1956 | Lubkin | 73/718 |
| 3,190,122 | 6/1965 | Edwards | 73/718 |
| 4,151,578 | 4/1979 | Bell | 361/283 |
| 4,158,217 | 6/1979 | Bell | 361/283 |
| 4,177,496 | 12/1979 | Bell et al. | 361/283 |
| 4,207,604 | 6/1980 | Bell | 361/283 |
| 4,227,419 | 10/1980 | Park | 73/724 |
| 4,388,668 | 6/1983 | Bell et al. | 361/283 |
| 4,393,714 | 7/1983 | Schmidt | 73/718 |
| 4,398,426 | 8/1983 | Park et al. | 73/724 |
| 4,426,673 | 1/1984 | Bell et al. | 361/283 |
| 4,432,238 | 2/1984 | Tward | 73/724 |
| 4,754,365 | 6/1988 | Kazahaya | 361/283 |
| 4,944,187 | 7/1990 | Frick et al. | 73/724 X |
| 5,604,315 | 2/1997 | Briefer et al. | 73/861.49 |

*Primary Examiner*—Joseph L. Felber
*Attorney, Agent, or Firm*—Chernoff, Vilhauer, McClung, & Stenzel, L

[57] ABSTRACT

A pressure sensor system includes a first conductive surface electrically isolated from a second conductive surface. A dielectric material is interposed between the first conductive surface and the second conductive surface. The dielectric material is movable with respect to at least one of the first conductive surface and the second conductive surface in response to a change in pressure exerted on the pressure sensor. A measurement system is connected to at least one of the first conductive surface and the second conductive surface to measure the capacitance between the first conductive surface and the second conductive surface representative of pressure.

14 Claims, 9 Drawing Sheets

CAPACITIVE PRESSURE SENSOR WITH MOVING OR SHAPE-CHANGING DIELECTRIC

BACKGROUND OF THE INVENTION

The present invention relates to a differential pressure sensor.

Transducers are widely used in measurement and control systems for converting a physical quantity, such as pressure, into a corresponding signal suitable for processing. A pressure transducer is a sensor which responds to an applied pressure and produces a signal (e.g., electrical, mechanical, or pneumatic) representative of the pressure. Typically, a pressure transducer utilizes a pressure-sensitive element that includes at least one sensor component having a position that varies with applied pressure. The position of the pressure-sensitive element is transformed into an electrical signal representative thereof.

One particular class of pressure transducers employs a peripherally supported metal diaphragm as the pressure-sensitive element and operates in response to an applied pressure to translate a physical displacement of the diaphragm into an electrical signal. A capacitive-sensing arrangement is used for the conversion from physical displacement into an electrical signal. Briefer et al., U.S. Pat. No. 5,604,315, disclose such a pressure transducer. The planar nature of the diaphragm makes it susceptible to measurement differences based on its orientation. A horizontally oriented diaphragm will experience a greater influence due to gravity than a vertically oriented diaphragm. Hence, horizontally and vertically oriented diaphragms will result in different pressure readings. Further, if the sensor is attached to a non-stationary object, such as a vibrating duct, the diaphragm will experience movement which introduces additional error into measurements made therefrom. Typically the metal diaphragm itself is supported by a metal support and the metal diaphragm tends to fatigue over time resulting in a drift of the measurements made therefrom. Accordingly, such pressure transducers need to be recalibrated, often on a monthly basis, to maintain accurate measurements.

Kavlico Corporation of Chatsworth, Calif. provides pressure transducers that include a ceramic body having on one side a circular depression of approximately three-thousand thousandths inches depth. The back inside surface of the circular depression is coated with a conductive metal surface. A first wire is connected to the conductive metal surface. Covering the circular depression is a ceramic diaphragm with a conductive metal coating that is electrically isolated from the conductive metal surface. The exterior side of the diaphragm is coated with a thin layer of ceramic. This configuration forms an enclosed cavity between the ceramic layer and the metal surfaces. A second wire is connected to the metal on the ceramic diaphragm. A housing encloses the pressure transducer and isolates both sides of the pressure transducer from one another. Together, a first exterior fitting of the housing and a hole in the ceramic body allows air flow to and from the enclosed cavity, and hence may exert pressure on one side of the ceramic diaphragm. A second exterior fitting of the housing allows air flow to and from the other side of the ceramic diaphragm, and hence may exert pressure thereon. The combination of the first and second fittings permit a differential pressure to be applied to the ceramic diaphragm which moves the diaphragm in accordance with the pressure differential. The first and second wires are used to measure the change in capacitance between the conductive metal surface and the metal on the ceramic diaphragm that occurs in accordance with any change in pressure differential. Similar to the class of pressure transducers discussed above, the Kavlico sensor is susceptible to gravity induced measurement differences based on orientation, vibrational effects when attached to non-stationary objects, and the ceramic diaphragm tends to fatigue over time resulting in drift of the measurements made therefrom. Accordingly, such pressure transducers need to be recalibrated, often on a monthly basis, to maintain accurate measurements. Such calibration is time consuming and expensive. Further, the dynamic range of such a pressure transducer, which is the range of measurements about a nominal value, is typically about 10 percent change in capacitance.

What is desired, therefore, is a pressure transducer that is substantially insensitive to gravity, vibration, and fatigue. Further, the pressure transducer should have a significant dynamic range, such as 100 percent change in capacitance.

SUMMARY OF THE PRESENT INVENTION

The present invention overcomes the aforementioned drawbacks of the prior art by providing a pressure sensor system that includes a first conductive surface electrically isolated from a second conductive surface. A dielectric material is interposed between the first conductive surface and the second conductive surface. The dielectric material is movable with respect to at least one of the first conductive surface and the second conductive surface in response to a change in pressure exerted on the pressure sensor. A measurement system is connected to at least one of the first conductive surface and the second conductive surface to measure the capacitance between the first conductive surface and the second conductive surface representative of pressure.

The total dynamic range of the pressure sensor may be on the order of 100 percent change in capacitance, which allows one sensor to be used for a wide variety of applications. The significant dynamic range of the pressure sensor also simplifies the sensitivity required for the electronics within the measurement system and hence its expense. Also, the pressure sensor is substantially insensitive to vibrational movement because the plates of the capacitor are stationary. In addition, the orientation of the pressure sensor is not important for accurate measurements because the system is preferably enclosed by diaphragms and the volume of the fluid is small. Moreover, the pressure sensor will not dry out over time because it is hermetically sealed. Also, by sealing the pressure sensor any effects as a result of humidity are eliminated.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
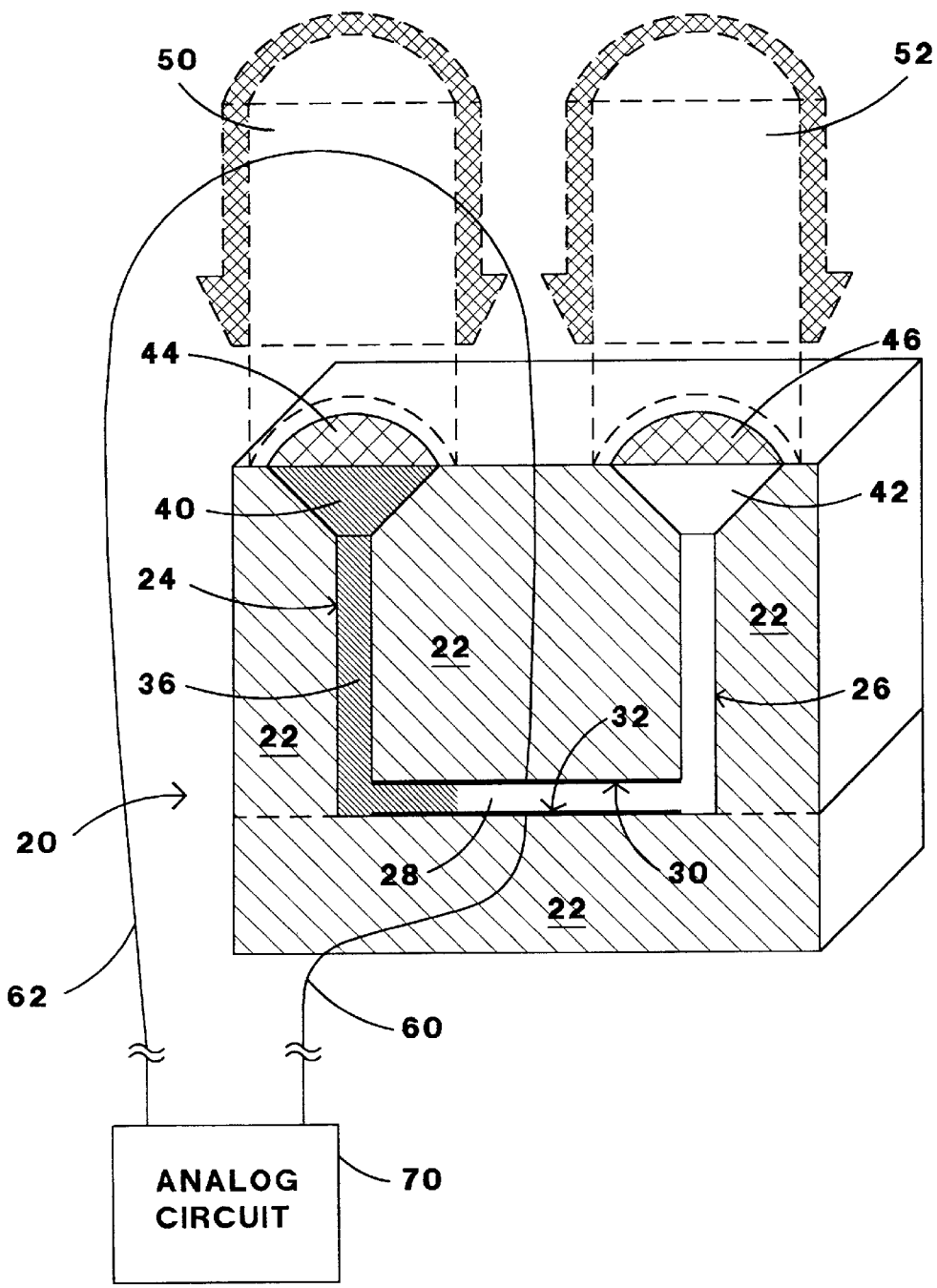
FIG. 1 is a sectional view of a first embodiment of a pressure sensor of the present invention.

Referring to FIG. 1, a pressure transducer 20, otherwise referred to as a sensor, is constructed from multiple pieces of ceramic material 22 which provides high electrical insulation and is physically dimensionally stable over a significant range of temperatures. Other suitable insulating materials may likewise be used, if desired, such as NORYL® plastic available from General Electric a synthetic thermoplastic resin. A pair of parallel vertical channels 24 and 26 are drilled, or otherwise machined, in the ceramic material 22. The channels 24 and 26 may be circular with a diameter of 20-thousandths of an inch. The vertical channels 24 and 26 are connected by a horizontal channel 28 having for example, a height of nine-thousandths of an inch and a depth of 22-thousandths of an inch. The channels 24, 26, and 28 may be other shapes and arranged in different orientations, if desired. Further, the sizes and measurements may be adapted to accommodate different utilities and performance requirements. A top surface 30 and a bottom surface 32 of the horizontal channel 28 are coated with metal coating, such as gold, and electrically isolated from one another. A capacitor is formed by the metal coating on the top surface 30 forming the top plate of the capacitor, the metal coating on the bottom surface 32 forming the bottom plate of the capacitor, and an interposed gap of the horizontal channel 28. Alternatively, any portion of two different sides or regions of the horizontal channel 28 may be coated with a conductive metal which are electrically isolated from one another to form the capacitor.

A sufficient volume of fluid 36 fills the vertical channel 24 and partially fills the horizontal channel 28. The preferred fluid 36 is sold under the trade name Krytox from DuPont which has a dielectric constant of approximately 2.4. Krytox includes perfluoropolyether (perfluoroalkylether) and substantially maintains its volume under pressure. The temperature coefficient of the fluid should be selected to minimize effects due to changes in temperature such as swelling. The viscosity of the fluid 36 and the dimensions of the channels 24, 26, and 28 are selected such that the surface tensions of the channels 24, 26 and 28 are sufficient to prevent the fluid from freely flowing within the channels 24, 26, and 28. Further, the surface tension and characteristics of the fluid 36, such as cohesion, should be sufficient to prevent any significant residual fluid 36 from adhering to the sides of the channels 24, 26, and 28 as the fluid 36 moves, as described later. Preferably, without any differential pressure exerted on the pressure transducer 20, the fluid 36 extends ⅓ of the distance of the horizontal channel 28. Such a location provides for substantial movement of the fluid 36 in the right direction for anticipated pressure changes, and less movement of the fluid 36 in the left direction for smaller anticipated pressure changes of opposite polarity.

"Funnel" shaped portions 40 and 42 are provided in the upper portion of the vertical channels 24 and 26, respectively. The funnel shaped portions 40 and 42 are preferably conical shaped with a height of 70 to 80 thousandths of an inch and a top diameter of 0.500 inches. A pair of flexible diaphragms 44 and 46 enclose the tops of the respective funnel shaped portions 40 and 42. The diaphragms preferably have a thickness of two-thousandths of an inch and may be constructed of zirconium. One of the diaphragms may be omitted, if desired, which may adversely affect the long term life of the fluid. The diaphragms may be constructed from any other suitable material. The vertical channel 26 and a right hand portion of the horizontal channel 28 form a sealed channel filled with air. Pressure ports 50 and 52 are connected to and encircle both the diaphragms 44 and 46 and the funnel shaped portions 40 and 42, respectively. As differential pressure is exerted on the pressure ports 50 and 52 the diaphragms 44 and 46 flex slightly in opposing directions thereby moving the fluid 36 either to the right or to the left within the horizontal channel 28. The movement of the fluid 36 is limited by the channels being a closed system. The funnel portions 40 and 42 provide a mechanical advantage so that minor pressure changes provide significant movement of the fluid 36 within the horizontal channel 28. The shape of the funnel portions 40 and 42 may be any suitable shape and size to provide the desired sensitivity for the movement of the fluid 36.

Wires 60 and 62 are electrically connected to the metal coating on the top surface 30 (top plate) and the metal coating on the bottom surface 32 (bottom plate) of the horizontal channel 28, respectively. The wires 60 and 62 are connected to an analog circuit 70 that measures the capacitance between the wires 60 and 62, and hence the capacitance between the top and bottom plates 30 and 32.

As the differential pressure exerted on the pressure ports 50 and 52 changes, the fluid 36 moves within the horizontal channel 28. The fluid 36 thereby fills more or less of the region between the top and bottom plates 30 and 32. This changes the capacitance sensed between the wires 60 and 62. The relatively high dielectric constant of 9.9 of the preferred TEFLON®-based fluid 36, as compared to a dielectric constant of 1.0 for air, provides a significant change in the capacitance for minor fluid 36 movement. The height to width ratio of the channel 28 is selected to set the initial capacitance of the sensor, as desired. Also, the change in capacitance, and hence measurements, is substantially linear with changing differential pressure.

The total dynamic capacitance range of the pressure transducer 20 is generally on the order of 100 percent, which allows one sensor to be used for a wide variety of applications. The significant dynamic range of the pressure transducer 20 simplifies the sensitivity required for the electronics within the analog circuit 70, and hence its expense. Also, the pressure transducer 20 is substantially insensitive to vibrational movement because the plates of the capacitor are stationary. In addition, the orientation of the pressure transducer 20 is not important for accurate measurements because the system is enclosed by the diaphragms 44 and 46 and the volume of the fluid 36 is small. Moreover, the pressure transducer 20 will not dry out over time because it is sealed. Also, by sealing the channels any effects due to humidity are minimized. Further, the upper surface 30 and lower surface 32 may be nonplanar.

To accommodate different pressure ranges, a fluid with a different dielectric constant may be selected. For example, alcohol with a dielectric constant of 33 may be used to provide sensitivity over a different pressure range. The dynamic range of the sensor may be modified by changing the length of the horizontal channel 28.

Figure 2:
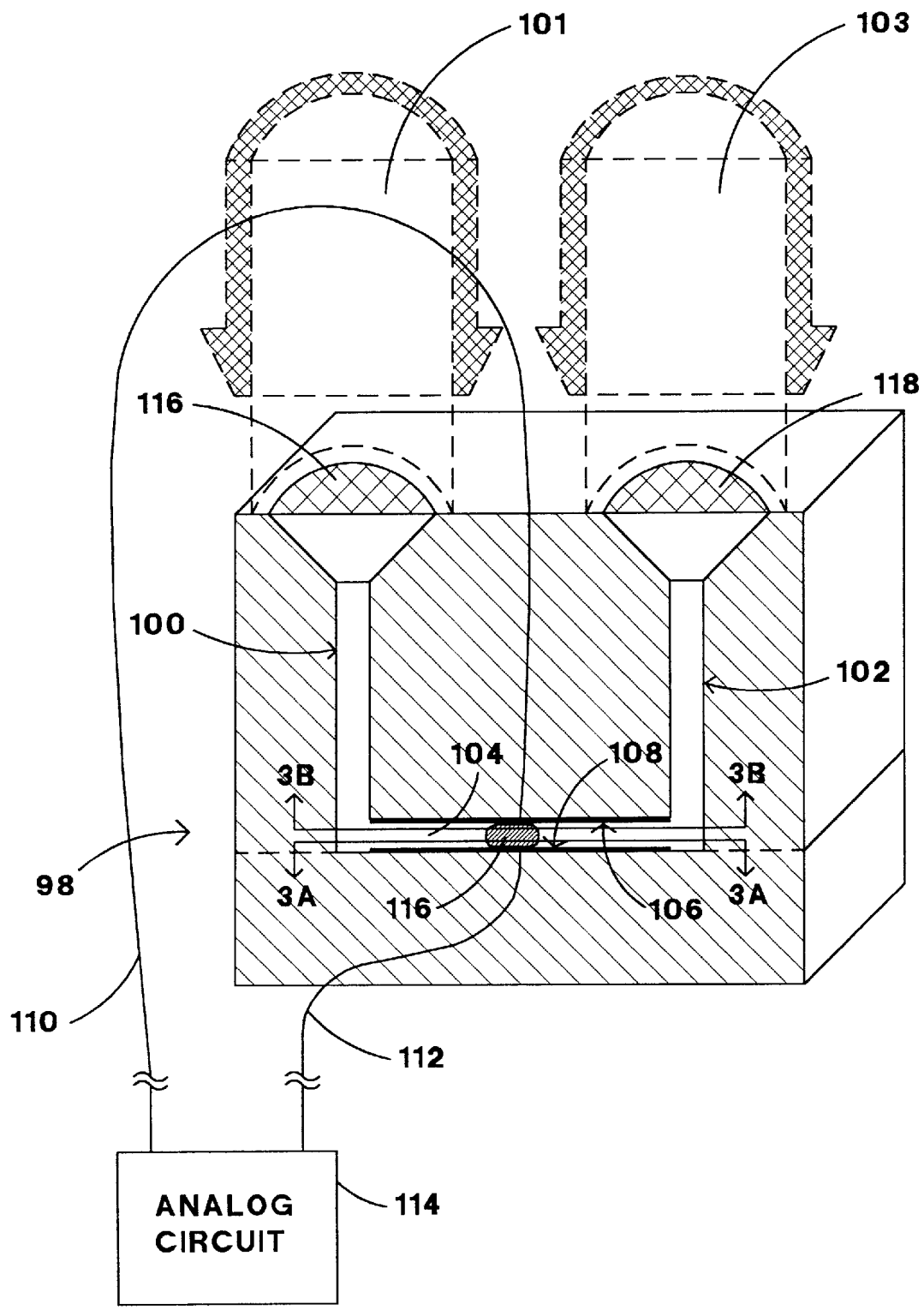
FIG. 2 is a sectional view of a second embodiment of a pressure sensor of the present invention.

Referring to FIG. 2, an alternative embodiment of a pressure transducer 98, similar to the pressure transducer 20 of FIG. 1, includes pair of vertical channels 100 and 102, and an interconnecting horizontal channel 104. The vertical channels 100 and 102 are sealed by respective diaphragms 116 and 118. One of the diaphragms 116 and 118 may be omitted. A pair of conductive upper and lower surfaces 106 and 108 are electrically isolated from one another. A pair of wires 110 and 112 electrically interconnect the conductive upper and lower surfaces 106 and 108 to an analog circuit 114. A relatively small volume of fluid 116, such as a drop, is located within the horizontal channel 104 between the conductive surfaces 106 and 108. As differential pressure is applied to a pair of ports 101 and 103, the diaphragms 116 and 118 flex and exert pressure on the fluid 116 thereby moving the fluid either to the right or to the left. The conductive surfaces 106 and 108 are preferably of dissimilar shapes so that movement of the fluid 116 may be detected using a capacitive eased system by sensing the change in capacitance between the conductive surfaces 106 and 108.

Figure 3A:
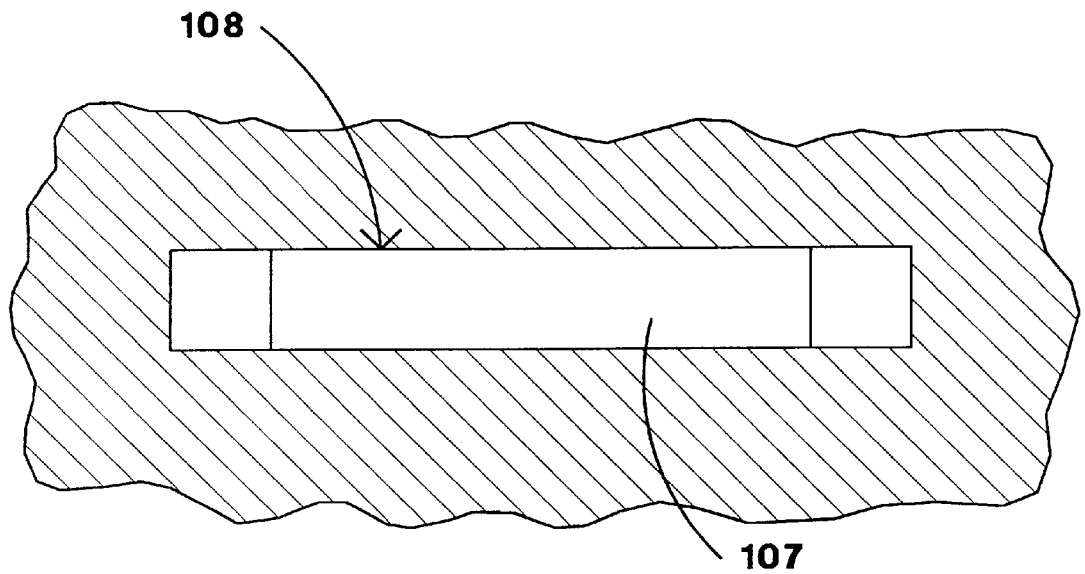
FIG. 3A is a partial cutaway sectional view of a conductive portion of a lower surface along line 3A—3A of FIG. 2.
Figure 3B:
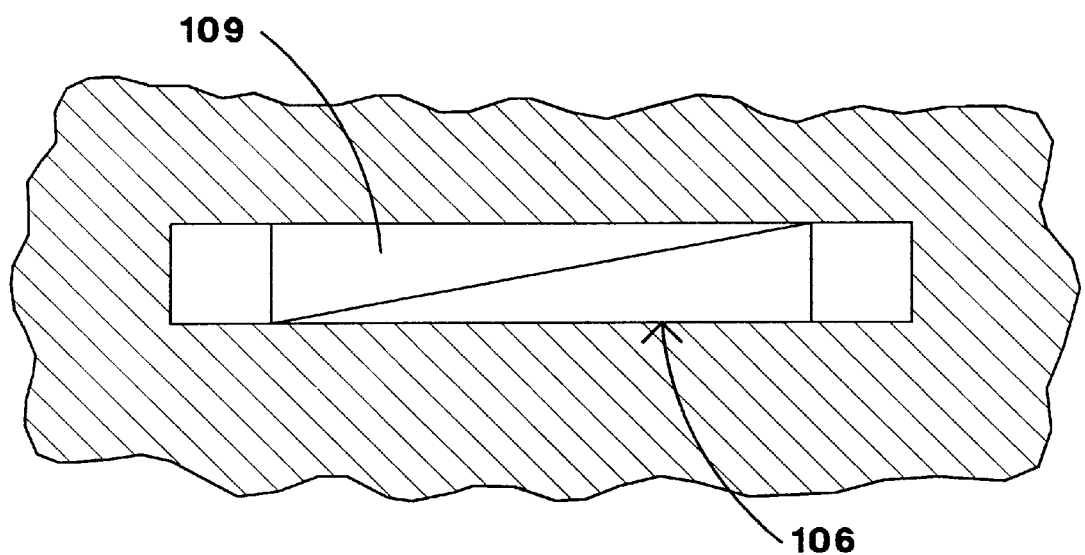
FIG. 3B is a breakaway sectional view of a conductive portion of an upper surface along line 3B—3B of FIG. 2.

Referring to FIG. 3A, the conductive portion 107 of the lower surface 108 is preferably rectangular in shape. Referring to FIG. 3B, the conductive portion 109 of the upper surface 106 is preferably triangular in shape. As the fluid 116 moves, the total surface area of the conductive portion 109 of the upper surface 106 in contact with the fluid 116 changes and thus the capacitance sensed by the analog circuit 114 changes. Based on the capacitance and the change in capacitance, the pressure is determined. Alternatively, the conductive portion of the upper surface may be rectangular and the conductive portion of the lower surface may be triangular. The principal benefit of using both rectangular and triangular shaped conductive areas is that the movement of the fluid 116 results in a linear capacitative change greater than that obtained using two rectangular plates. The conductive portions of the lower and upper surfaces may be any shape. Also, the conductive portions may be any portion of two different sides or regions of the channel that are electrically isolated from one another.

Figure 5A:
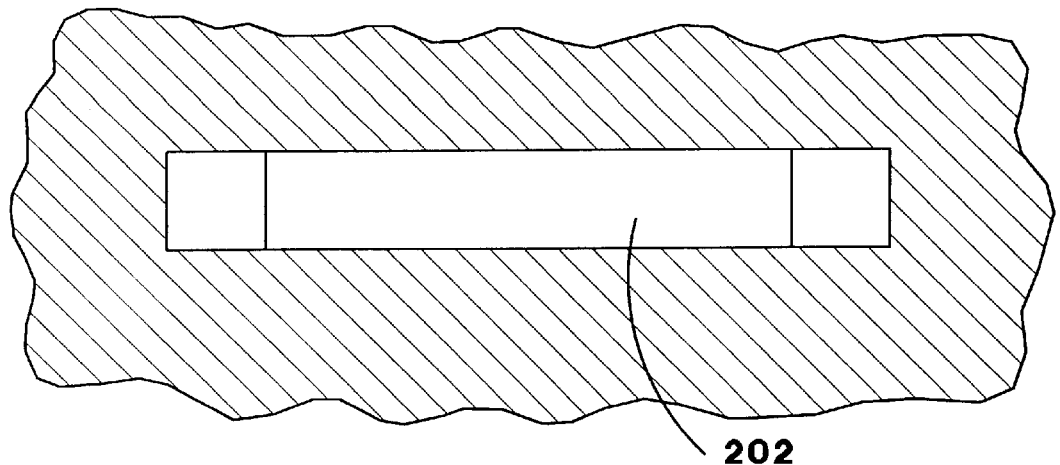
FIG. 5A is a breakaway sectional view of a lower conductive surface.
Figure 5B:
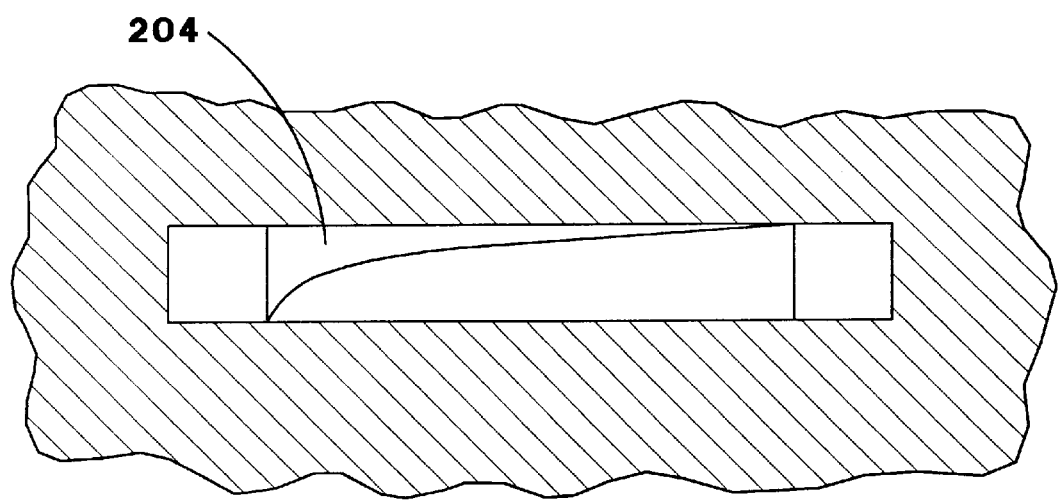
FIG. 5B is a breakaway sectional view of an upper conductive surface.

Referring to FIGS. 5A and 5B, a further alternative embodiment, similar to the embodiment shown in FIGS. 3A and 3B, includes a rectangular shaped lower conductive surface 202 and an exponential curve shaped upper conductive surface 204, respectively. This results in a pressure transducer that has a logarithmic output. The upper surface may be rectangular and the lower surface may be exponential, if desired. The fluid in the horizontal channel may be a drop of fluid such as that shown in FIG. 2 or a larger volume of fluid as shown in FIG. 1.

Figure 6A:
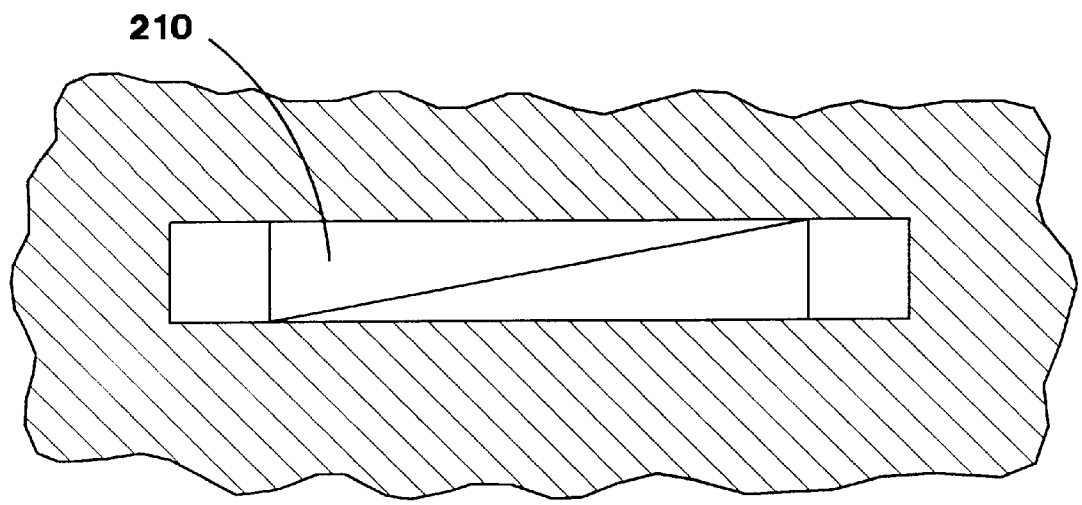
FIG. 6A is a breakaway sectional view of a lower conductive surface.
Figure 6B:
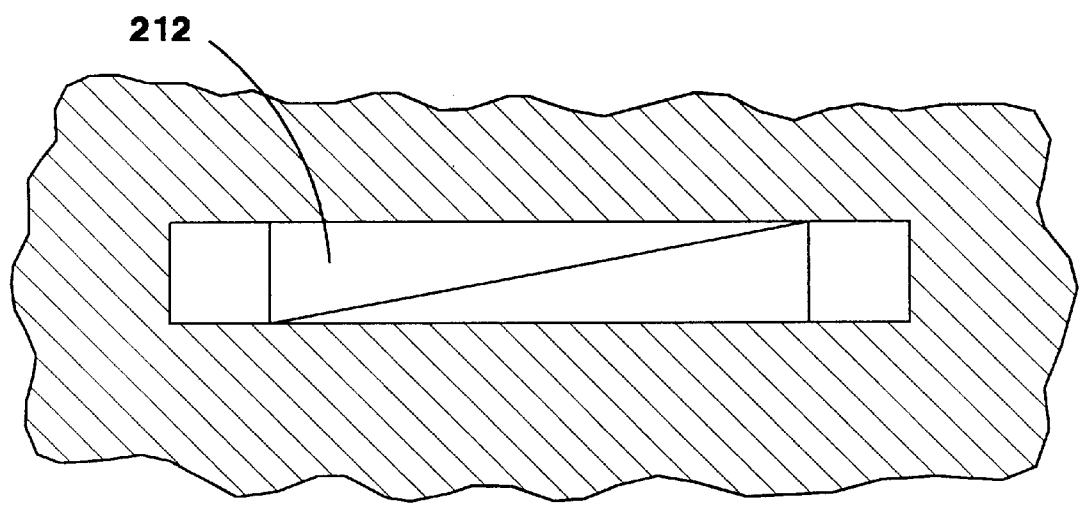
FIG. 6B is a breakaway sectional view of an upper conductive surface.

Referring to FIGS. 6A and 6B, another alternative embodiment, similar to the embodiment shown in FIGS. 3A and 3B, includes conductive lower and upper surfaces 210 and 212 of similar shape, such as triangular, respectively. The movement of fluid between such surfaces will result in a change in capacitance. The fluid in the horizontal channel may be a drop of fluid such as that shown in FIG. 2 or a larger volume of fluid such as that shown in FIG. 1.

Figure 7A:
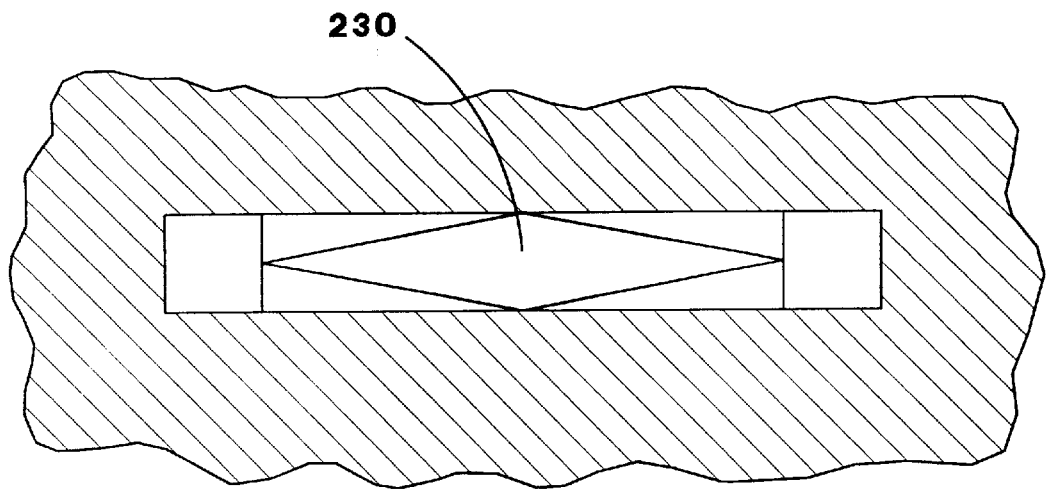
FIG. 7A is a breakaway sectional view of a lower conductive surface.
Figure 7B:
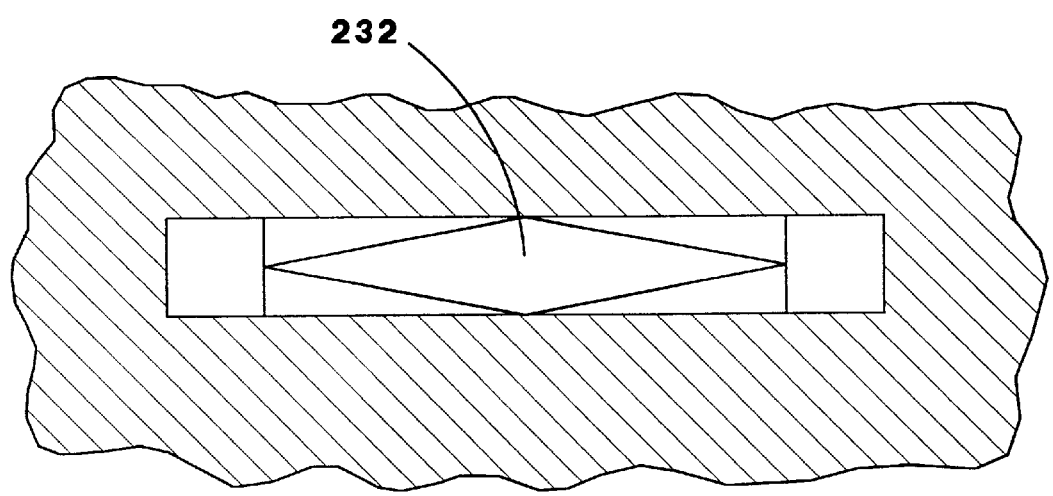
FIG. 7B is a breakaway sectional view of an upper conductive surface.

Referring to FIGS. 7A and 7B, another alternative embodiment, similar to the embodiment shown in FIGS. 3A and 3B, includes one or more symmetric lower and upper conductive surfaces 230 and 232, respectively. With the fluid centrally located, a change in either direction results in a positive change in pressure. As a result, simpler electronics may be used because sign differentiation is not necessary. The fluid in the horizontal channel may be a drop of fluid such as that shown in FIG. 2 or a larger volume of fluid such as that shown in FIG. 1.

Figure 4:
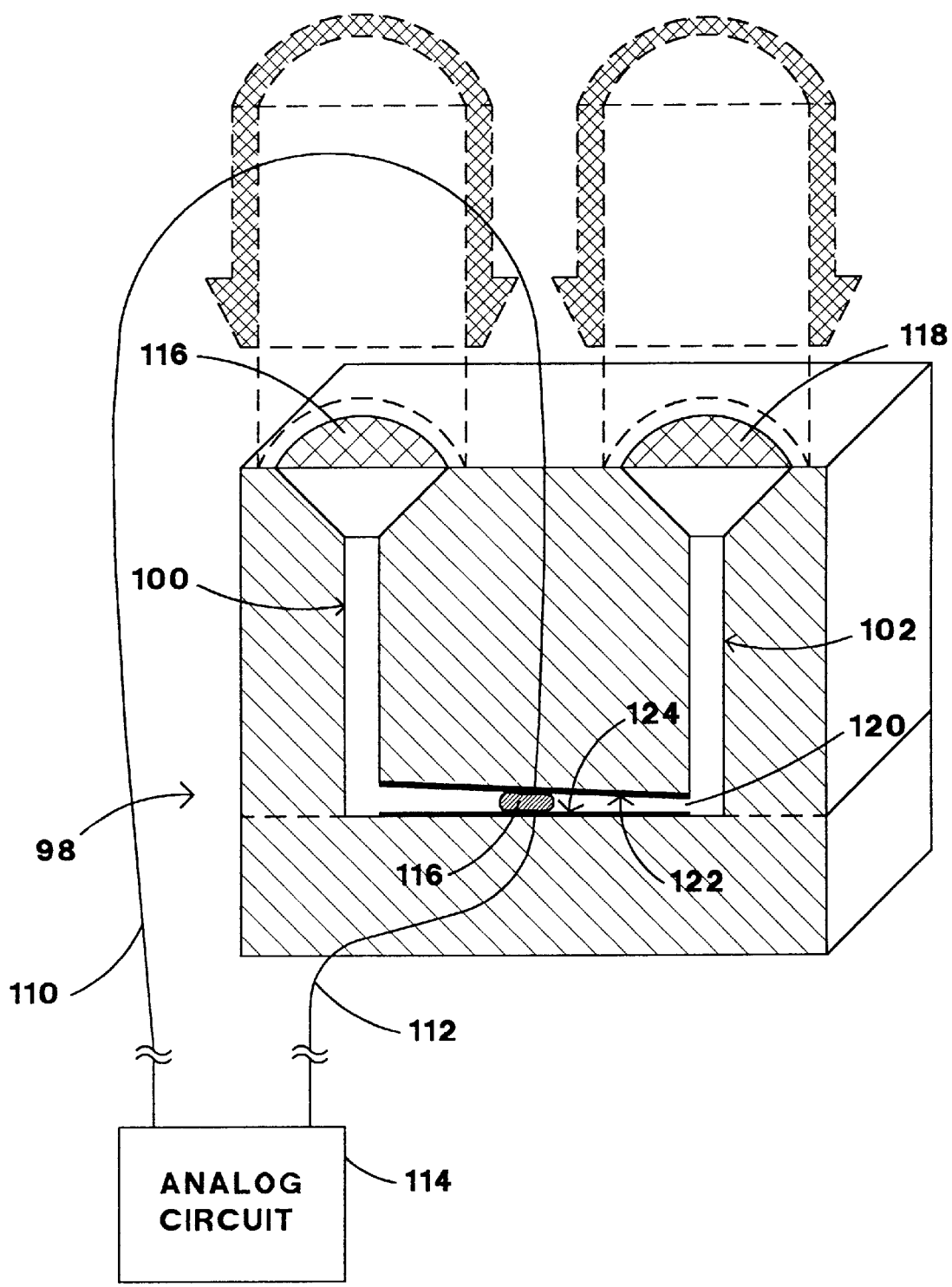
FIG. 4 is a sectional view of a third embodiment of a pressure sensor of the present invention.

Referring to FIG. 4, a further alternative embodiment, similar to the embodiment shown in FIG. 2, includes the horizontal channel 120 having nonparallel upper and lower surfaces 122 and 124. The surface area in contact with the fluid 116, and thus the sensed capacitance, changes with the movement of the fluid along the horizontal channel. The shape of the conductive portions on the upper and lower surfaces 122 and 124 may be selected as desired. The fluid 116 in the horizontal channel 120 may be a drop of fluid such as that shown in FIG. 2 or a larger volume of fluid such as that shown in FIG. 1.

Figure 8:
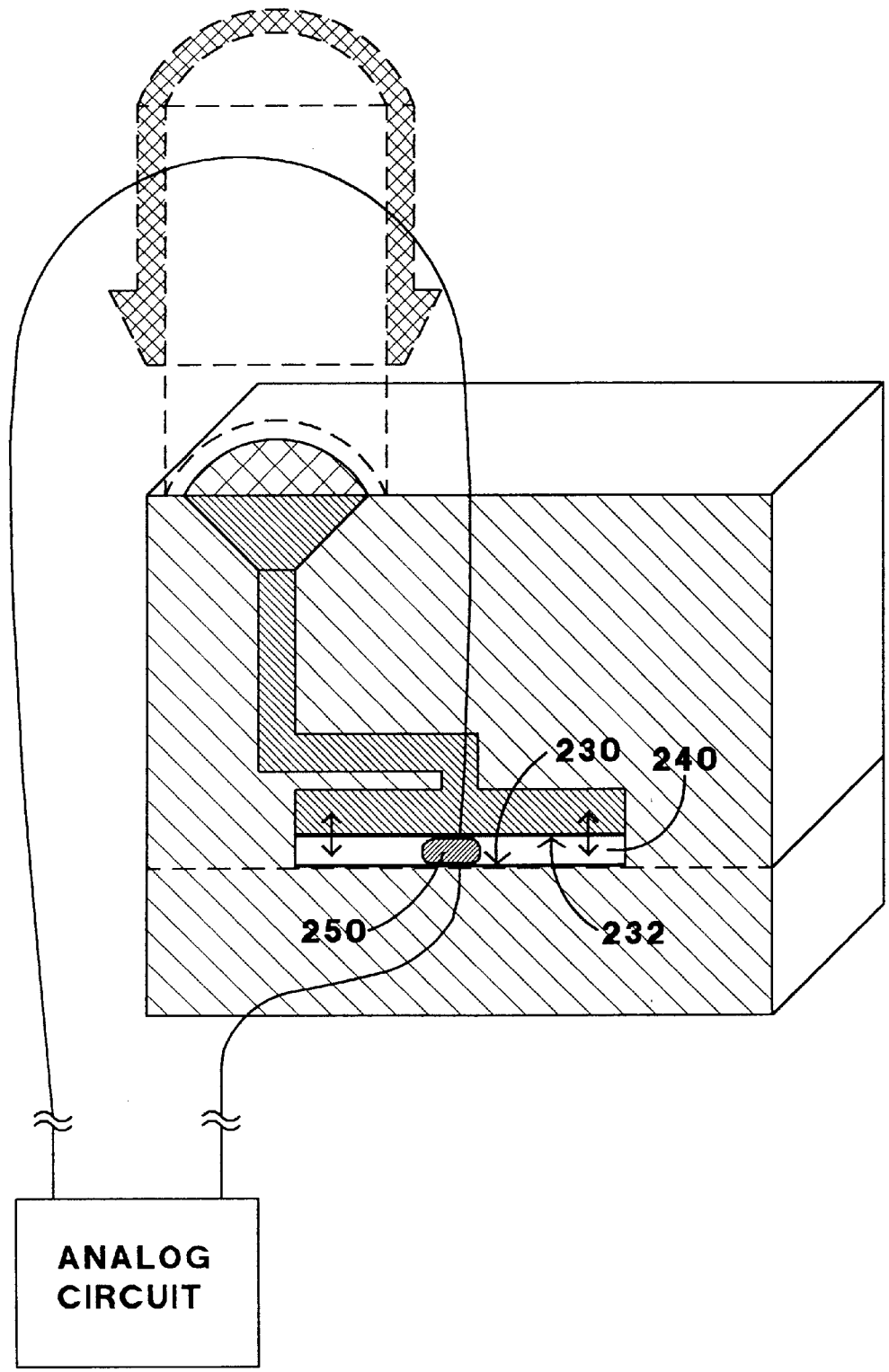
FIG. 8 is a sectional view of a fourth embodiment of a pressure sensor of the present invention.

Referring to FIG. 8, another alternative embodiment includes lower and upper capacitive surfaces 230 and 232 being movable with respect to each other with a fluid 250, preferably having a density greater than air, interdisposed between. A channel 240 is defined between the conductive surfaces 230 and 232. The applied pressure difference results in increasing or decreasing the pressure exerted on the fluid 250 and thereby changes the effective surface area of the conductive surfaces 230 and 232 in contact with the fluid 250. The movement of the capacitive surfaces 230 and 232 results in a capacitative change, and hence the pressure can be measured therefrom. The fluid in the horizontal channel 240 may be a drop of fluid such as that shown in FIG. 2 or a larger volume of fluid such as that shown in FIG. 1.

Figure 9:
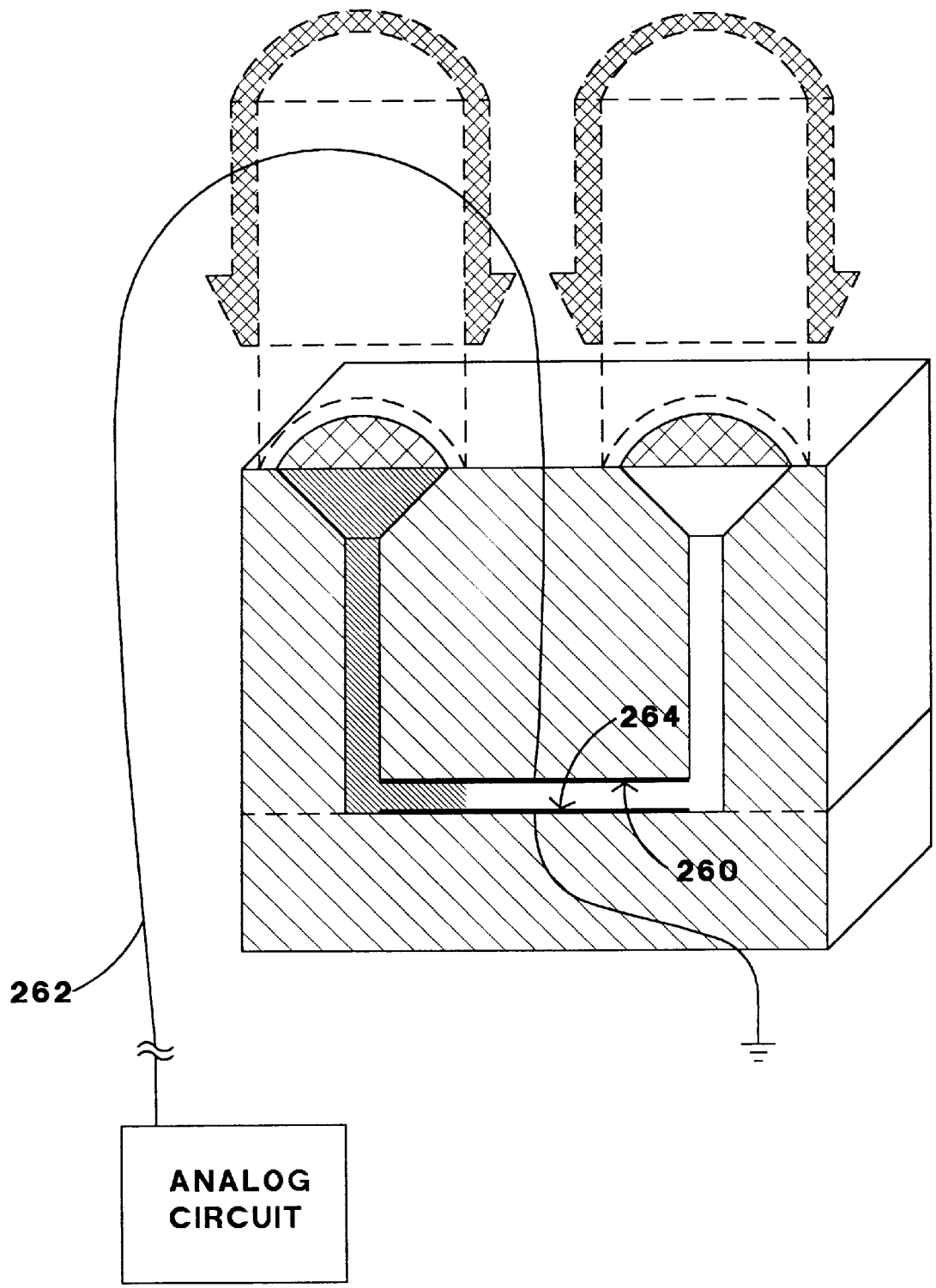
FIG. 9 is a sectional view of a fifth embodiment of a pressure sensor of the present invention.

Referring to FIG. 9, which is similar to FIGS. 1 and 2, one capacitive surface 260 may be connected to a signal path 262 while the other capacitive surface 264 is grounded.

While the preferred embodiment has been shown with a right/left orientation, it is to be understood that any other orientation may likewise be used.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A pressure sensor comprising:
   (a) a first conductive surface electrically isolated from a second conductive surface;
   (b) a dielectric material interposed between said first conductive surface and said second conductive surface;
   (c) said dielectric material being movable with respect to at least one of said first conductive surface and said second conductive surface in response to a change in pressure exerted on said pressure sensor;
   (d) a measurement system connected to at least one of said first conductive surface and said second conductive surface to measure the capacitance between said first conductive surface and said second conductive surface representative of said pressure; and
   wherein said first conductive surface and said second conductive surface are nonparallel with respect to each other, so that the distance between said first and second conductive surfaces at one location is different from the distance between said first and second conductive surfaces at another location.

2. A pressure sensor comprising:
   (a) a first conductive surface electrically isolated from a second conductive surface;
   (b) a dielectric material interposed between said first conductive surface and said second conductive surface;
   (c) said dielectric material being movable with respect to at least one of said first conductive surface and said second conductive surface in response to a change in pressure exerted on said pressure sensor;
   (d) a measurement system connected to at least one of said first conductive surface and said second conductive surface to measure the capacitance between said first conductive surface and said second conductive surface representative of said pressure; and
   wherein said first conductive surface and said second conductive surface have dissimilar shapes.

3. The pressure sensor of claim 2 wherein said first conductive surface is substantially rectangular and said second conductive surface is substantially triangular.

4. A method of measuring pressure comprising the steps of:
   (a) providing a first conductive surface electrically isolated from a second conductive surface;
   (b) moving a dielectric material interposed between said first conductive surface and said second conductive surface with respect to at least one of said first conductive surface and said second conductive surface in response to a change in pressure;
   (c) determining a pressure by measuring the capacitance between said first conductive surface and said second conductive surface; and
   wherein said first conductive surface and said second conductive surface are nonparallel to each other, so that the distance between said first and second conductive surfaces at one location is different from the distance between said first and second conductive surfaces at another location.

5. A method of measuring pressure comprising the steps of:
   (a) providing a first conductive surface electrically isolated from a second conductive surface;
   (b) moving a dielectric material interposed between said first conductive surface and said second conductive surface with respect to at least one of said first conductive surface and said second conductive surface in response to a change in pressure;
   (c) determining a pressure by measuring the capacitance between said first conductive surface and said second conductive surface; and
   wherein said first conductive surface and said second conductive surface have dissimilar shapes.

6. The method of claim 5 wherein said first conductive surface is substantially rectangular and said second conductive surface is substantially triangular.

7. A method of measuring pressure comprising the steps of:
   (a) providing a first conductive surface electrically isolated from a second conductive surface and defining a gap therebetween;
   (b) moving said first conductive surface with respect to said second conductive surface, while said first and second conductive surfaces are in contact with a dielectric material therebetween, said dielectric material occupying less than all of said gap and having a density greater than air, in response to a change in pressure exerted on a pressure sensor; and
   (c) determining a pressure by measuring the capacitance between said first conductive surface and said second conductive surface.

8. A pressure sensor comprising:
   (a) a first conductive surface electrically isolated from a second conductive surface;
   (b) a dielectric material interposed between said first conductive surface and said second conductive surface;
   (c) said dielectric material being movable with respect to at least one of said first conductive surface and said second conductive surface in response to a change in pressure exerted on said pressure sensor;
   (d) a measurement system connected to at least one of said first conductive surface and said second conductive surface to measure the capacitance between said first conductive surface and said second conductive surface representative of said pressure; and
   (e) wherein at least one of said first conductive surface and said second conductive surface is housed withing a body comprised of a nonconductive material, said body defining a first channel in fluid communication with both at least one diaphragm attached to said body and at least one of said first conductive surface and second conductive surface.

9. The pressure sensor of claim 8 further comprising a pair of nonconducting surfaces interconnecting said first conductive surface and said second conductive surface, thereby defining a second channel between the combination of said first conductive surface, said second conductive surface, and said pair of nonconducting surfaces.

10. The pressure sensor of claim 9 wherein said second channel has a cross section that is generally rectangular in shape.

11. The pressure sensor of claim 8 wherein said dielectric material has a dielectric constant greater than 9.

12. The pressure sensor of claim 8 further comprising another diaphragm attached to said body, wherein said dielectric material is located within a fluid path interconnecting said diaphragms.

13. The pressure sensor of claim 8 wherein at least one of said first and second conductive surfaces is formed by coating a metal on a portion of said body.

14. A pressure sensor comprising:
   (a) a first conductive surface electrically isolated from a second conductive surface;
   (b) a dielectric material interposed between said first conductive surface and said second conductive surface;
   (c) said dielectric material being movable with respect to at least one of said first conductive surface and said second conductive surface in response to a change in pressure exerted on said pressure sensor;
   (d) a measurement system connected to at least one of said first conductive surface and said second conductive surface to measure the capacitance between said first conductive surface and said second conductive surface representative of pressure; and
   (f) said first conductive surface and said second conductive surface opposing each other and defining a volume therebetween, said dielectric material occupying a space smaller than said volume.

* * * * *

UNITED STATES PATENT AND TRADEMARK OFFICE
CERTIFICATE OF CORRECTION

PATENT NO. : 6,122,972
DATED : September 26, 2000
INVENTOR(S) : Jim Crider

Page 1 of 1

It is certified that error appears in the above-identified patent and that said Letters Patent is hereby corrected as shown below:

Column 8,
Line 25, change "withing" to -- within --

Signed and Sealed this

Twenty-first Day of May, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO.     : 6,122,972
DATED          : September 26, 2000
INVENTOR(S)    : Jim Crider It is certified that error appears in the above-identified patent and that said Letters Patent is hereby corrected as shown below:

Column 5,
Line 28, change "eased" to -- based --

Signed and Sealed this

First Day of October, 2002

Attest:

Attesting Officer

JAMES E. ROGAN
Director of the United States Patent and Trademark Office